(12) United States Patent
Otsuka

(10) Patent No.: US 10,685,584 B2
(45) Date of Patent: Jun. 16, 2020

(54) SYSTEMS FOR MAPPING HUMAN VALUES AND PURPOSE

(71) Applicant: Coretography, LLC, Penngrove, CA (US)

(72) Inventor: Tracy Otsuka, Penngrove, CA (US)

(73) Assignee: Coretography, LLC, Penngrove, CA (US)

( * ) Notice: Subject to any disclaimer, the term of this patent is extended or adjusted under 35 U.S.C. 154(b) by 775 days.

(21) Appl. No.: 14/990,805

(22) Filed: Jan. 8, 2016

(65) Prior Publication Data

US 2017/0200388 A1    Jul. 13, 2017

(51) Int. Cl.
*G09B 19/00* (2006.01)
*G09B 19/22* (2006.01)
*A63F 3/00* (2006.01)
*A63F 1/00* (2006.01)

(52) U.S. Cl.
CPC .......... *G09B 19/00* (2013.01); *G09B 19/0076* (2013.01); *G09B 19/22* (2013.01); *A63F 1/00* (2013.01); *A63F 3/00006* (2013.01)

(58) Field of Classification Search
CPC ....... A63F 3/00006; A63F 1/00; G09B 19/22; G09B 19/0076; G09B 19/00
See application file for complete search history.

(56) References Cited

U.S. PATENT DOCUMENTS

| | | | | |
|---|---|---|---|---|
| 4,095,799 A | * | 6/1978 | Stringer | A63F 3/00069 273/236 |
| 5,136,686 A | * | 8/1992 | Koza | G06N 3/126 706/13 |
| 6,065,749 A | * | 5/2000 | Debie | A63F 3/00006 273/243 |
| 6,267,375 B1 | * | 7/2001 | Bernstein | A63F 3/00006 273/236 |
| 7,577,597 B1 | * | 8/2009 | Allison | G06Q 20/102 235/379 |
| 8,567,787 B1 | * | 10/2013 | Chang | A63F 1/00 273/299 |
| 9,278,278 B1 | * | 3/2016 | Villarreal-Reyes | G09B 19/22 |
| 9,443,002 B1 | * | 9/2016 | Freese | G06F 16/24578 |
| 2003/0182177 A1 | * | 9/2003 | Gallagher | G06Q 30/0203 705/7.12 |
| 2003/0229527 A1 | * | 12/2003 | Fletcher | G06Q 10/10 706/47 |
| 2007/0020596 A1 | * | 1/2007 | Thurman | G09B 19/00 434/238 |
| 2012/0101852 A1 | * | 4/2012 | Albert | G06Q 40/08 705/4 |
| 2012/0323816 A1 | * | 12/2012 | Clouse | G06Q 40/06 705/36 R |
| 2012/0324353 A1 | * | 12/2012 | Torbey | G06F 3/04847 715/716 |
| 2014/0058960 A1 | * | 2/2014 | Porter | G06Q 50/18 705/311 |
| 2016/0012538 A1 | * | 1/2016 | Costaceque-Cecchi-Dimeglio | G06Q 40/06 705/36 R |
| 2016/0284229 A1 | * | 9/2016 | Hatton | A63F 13/807 |

\* cited by examiner

*Primary Examiner* — Jack Yip
(74) *Attorney, Agent, or Firm* — Richard Aron Osman

(57) ABSTRACT

Methods and systems for mapping human values and purpose employ a library of value chips, each chip displaying a different human value; chip organizers comprising value and purpose prompts and input sections and values bracket template for selecting user-relevant chips from the library; and a visual values board configured to display and map the selected chips.

1 Claim, No Drawings

SYSTEMS FOR MAPPING HUMAN VALUES AND PURPOSE

INTRODUCTION

Studies have shown that the 'secret' to happiness is knowing and living your values and your purpose . . . and the considerable interest in anything related to self-development is a good indicator of just how desperately people want to find out exactly how to do this. Coretography provides a better way to connect all those dots, in a faster, simpler, meaningful way. A method that cuts through the noise and confusion and overwhelm and gets to action, and a better, happier life.

The systems is enabling: make big, important life decisions with confidence and clarity; get a clear vision on what you want out of life, and how you're going to make it happen; feel truly capable of navigating life's difficult situations and relationships without risk of ever losing yourself or your voice; and wake up every day feeling like your true self, and (wildly) happily so.

SUMMARY OF THE INVENTION

The invention is a personal coaching tool or self-help system called Coretography, that helps users get to the core of who they are and why they're here. Coretography helps the user answer questions: (1) Who am I? (What do I value?), (2) Why am I here? (What is my purpose?); and (3) What am I meant to do with my life? (How do I live my purpose?)

The system includes a worksheet that addresses these questions and walks the user through the process. There's a series of value chips, chip organizers, an optional bracketing template that helps the user cull down to their top values, and a visual board where the user organizes her values, and then can refer to them when making life decisions.

The invention provides methods and systems for mapping human values and purpose. In one aspect the invention provides a system for mapping human values and purpose comprising: (a) a library of value chips, each chip displaying a different human value; (b) one or more chip organizers (such as cards, wells or trays) comprising value and purpose prompts and input sections for selecting user-relevant chips from the library; and (c) a visual values board comprising value chip locators and configured to display and map the selected user-relevant chips.

In embodiments,
the system further comprises a bracketing template comprising value chip position locators and configured to assist in choosing between competing values, such as a pair-wise tournament bracketing decision tree format, which may include the total number (e.g. 10, 15 or 20) of top value, user-relevant chips to be selected, or a subset thereof.
each chip further comprises annotation, example or definition of the corresponding value; for example, the library may comprise at least 1, 3, 5, 10, 15 or 20 of the following values and/or definitions: Acceptance (Amenable, open, approving); Accomplishment (The successful achievement of a task(s)); Accuracy (The quality of being correct or precise, free from error); Achievement (A result gained by hard work and effort); Adaptability (Able to adjust oneself readily to different conditions); Adventure (Exciting, unusual or daring activities); Affluence (The state of having a great deal of money/wealth); Altruism (Feelings/behavior that shows a desire to help others); Ambition (A desire to be successful, powerful or famous); Appreciation (The recognition and enjoyment of the good qualities of someone); Articulacy (Able to express ideas clearly and effectively in speech or writing); Assertiveness (Having or showing a confident and forceful personality); Attractiveness (Beauty in appearance or manner); Authenticity (Genuineness, true to ones own personality or character); Balance (Mental and emotional steadiness); Being the Best (Being better than all others); Beauty (Combination of qualities that give pleasure—harmony of form or color); Being Cool (Appearing fashionable, hip); Belonging (To feel happy and comfortable with a particular group of people); Boldness (Courage or daring); Brilliance (Exceptional intelligence or talent, genius); Calmness (A quiet and peaceful state or condition); Camaraderie (A feeling of good friendship among people in a group); Candor (Being frank, open and sincere in expression or speech); Challenging the status quo (Identify new and better ways of doing things); Charity (Voluntarily giving help to those in need); Charm (The quality of pleasing, fascinate or attracting people); Chastity (Celibacy, abstinence, self-restraint); Cheerfulness (Promoting cheer; pleasant; bright); Clarity (Being clear as to perceptions, thoughts or understanding); Cleanliness (The practice of keeping yourself and your surroundings clean); Cleverness (Mental skill or quickness); Comfort (Contented well-being, a life of ease); Commitment (Being dedicated to a cause or activity); Community (Group of people who have a common interest); Compassion (Feeling of sympathy for another accompanied by desire to alleviate the suffering); Competitiveness (Strong desire to compete or succeed); Composure (Being calm and possessing self-control); Confidence (Belief in oneself and one's powers or abilities); Conformity (Behaving in a manner that is in accordance with socially accepted conventions or standards); Cooperation (Process of working together to the same end); Connection (A relation of personal intimacy, close friendship); Contribution (Giving away your money, possessions or your time); Conviction (Firm beliefs or opinions); Courage (Quality of mind/spirit that enables one to face difficulty, danger, pain without fear); Craftiness (Skillful, clever, cunning); Creativity (The use of the imagination or original ideas); Curiosity (The desire to learn or know about anything, inquisitiveness); Decorum (Etiquette, good taste and propriety); Dependability (Reliability, trustworthiness); Depth (Complexity of thought, insight, wisdom); Determination (Firm intention to achieve a desired end); Dignity (Quality of being worthy of honor or respect); Diligence (Meticulous, thorough work or effort); Discipline (Being able to control one's behavior to achieve a desired result); Diversity (A variety or assortment); Drive (An innate urge to attain a goal or satisfy a need); Dominance (Power and influence over others); Education (Instruction at a school or university); Efficiency (Ability to do something without wasting time or materials); Elegance (Graceful and stylish in appearance or manner); Empathy (The power of understanding other people's feelings); Energy (Natural enthusiasm and effort); Entertainment (Amusement, enjoyment, pleasure and leisure); Enthusiasm (Eagerness, zeal, fervor); Entrepreneurism (Identifying a need and taking initiative and financial risks to fill it); Environmentalism (Protecting the natural environment from destruction or pollution); Equality (Being equal in status, rights and opportunities); Excellence (Extremely high quality); Excitement (Stimulation or thrill); Exclusivity (Limiting access, only allowing certain people to participate); Experience (Obtaining knowledge or skill by doing, observing or feeling); Expertise (Expert knowledge/skill/proficiency in a field); Exploration (The act of investigating, researching, surveying); Extravagance (Showing a lack of restraint in spending money or using resources); Fairness (Lack of favoritism toward one side or another); Faith (Strong belief or trust in someone or something); Fame (Being widely known, recognized, famous); Family (All the descendants of a common ancestor); Fashion (Trends in styles of dress); Fidelity (Faithfulness to a person, cause or belief); Fitness (The quality or state of being fit); Flexibility (Willing to change or to try different things); Freedom (The quality or state of being free); Friendship (A relationship between friends); Frugality (Being very careful about how and what money is used on); Fun (Enjoyment); Generosity (Being kind and giving); Gratitude (The quality or feeling of being thankful); Happiness (A state of well-being and contentment); Hard Work (Using a lot of time and energy to do work); Harmony (Internal calm, tranquility); Health (A person's mental or physical condition, fitness); Heart (Courage, fortitude and determination); Helpfulness (Willing to help other people); Hospitality (The friendly reception and treatment of guests or strangers); Humility (Not thinking you are better than other people; Humor (The quality of being amusing or comic); Imagination (The ability to think of new things); Impact (Having a strong effect on someone or something); Imperfection (The quality of not being perfect); Inclusivity (The quality of including people); Independence (Freedom from outside control or support); Ingenuity (Skill or cleverness that allows someone to solve problems, invent things etc.); Innovation (Original and creative in thinking); Inquisitiveness (Eager desire to find out about things that are none of one's business); Integrity (The quality of being honest and having strong moral principles); Intelligence (Capacity for learning, reasoning and similar forms of mental activity); Integrity (The quality of being honest and having strong moral principles); Intimacy (Close familiarity or friendship; closeness); Intuition (An ability to know something without any proof or evidence); Inventiveness (Creative, imaginative, innovative, entrepreneurial); Investing (Putting money or capital into a project with the expectation or profit or income); Joy (A feeling of great pleasure and happiness); Justice (The quality of being fair and reasonable); Kindness (The quality or state of being kind); Knowledge (Facts, information and skills acquired through experience or education); Leadership (The action of leading a group of people or an organization); Learning(Knowledge acquired through experience, study or being taught); Legacy (Something that has come from someone in the past or that happened in the past); Living To Your Full Potential (Achieving the most your are capable of); Logic (A proper or reasonable way of thinking about or understanding something); Loyalty (A strong feeling of support or allegiance); Love (An intense feeling of deep affection); Maintaining the Status Quo (Keeping things the way they currently are, resistant to change or progress); Making a Difference (Having a significant effect on a person or situation); Marriage (A legal union between two persons entailing legal obligations); Mastery (Full command of a subject, attaining expert status); Mindfulness (Mental state achieved by focusing on the present moment); Moderation (The avoidance of excess or extremes); Modesty (Being unassuming or moderate when estimating one's abilities); Motivating Others (Stimulate interest in or enthusiasm in another for doing something); Music (Vocal or instrumental sounds); Mysteriousness (The quality of being impossible to know or understand); Nature (The physical world collectively, including plants, animals, the landscape); Open-mindedness (Willing to consider different ideas or opinions); Optimism (Hopefulness and confidence about the future); Order (A state of everything being in its right place); Organization (The quality of being arranged in a way that is sensible and useful); Originality (The quality of being novel, unusual, creative, unique); Passion (Powerful or compelling emotion or feeling); Patriotism (Love and devotion to one's country); Peace (Untroubled, tranquil, content); Perfection (Improving something until it is free from defects); Persistence (The act of not giving up in spite of difficulty); Personal Growth (Develop talents and potential, realize dreams and aspirations); Persuasiveness (Able to cause people to do or believe something); Philanthropy (Desire to promote the welfare of others by the donation of money); Piety (Being religious or devoted); Playfulness (Full of fun and high spirits); Pleasure (A feeling of happy satisfaction and enjoyment); Privacy (Being away from public attention); Poise (A calm, confident manner); Popularity (Being liked, admired or supported by many people); Power (The ability to influence the behavior of others); Practicality (Functional, useful); Presence (The state of being present); Precision (Being exact or precise); Problem Solving (Someone who defines and solves problems); Punctuality (Being on time); Purity (Freedom from immorality, virtuous, saintly); Realism (The tendency to view or represent things as they really are); Recognition (Appreciation or acclaim for an achievement or ability); Recreation (A pastime, diversion or other resource that is enjoyable); Relationships (Connection or association between people); Relaxation (Time spent resting and enjoying yourself); Resilience (The capacity to recover quickly from difficulties); Resourcefulness (Able to deal well with new situations and to find solutions to problems); Respect (An attitude of deference, admiration or regard); Security (The state of being free from danger or threat); Self-reliance (Reliance on one's own capabilities, judgment or resources); Sensuality (Physically pleasing); Serenity (Being serene, calm, and at peace); Sexuality (The quality or state of being sexual); Significance (The quality of being worthy of attention or importance); Simplicity (Absence of decoration or adornment. Plain and natural.); Sincerity (Honest, truthful, trustworthy); Solitude (Being alone); Sophistication (Taste, manners and ideas that are altered by education, experience, travel); Speed (Rapidity of movement or action); Spirituality (Concern with religion or religious matters); Spontaneity (Sudden inner impulse and without premeditation or external stimulus); Stability (The quality or state of something that is not easily changed or likely to change); Strength (The quality or state of being strong emotionally or physically); Structure (Arranged according to a plan); Success (The attainment of wealth, position or honor); Teaching (To impart knowledge or skill); Teamwork (Cooperative effort by a group of persons in the interests of a common cause); Tidiness (Orderly and clean); Thoughtfulness (Someone who considers other people's feelings); Tolerance (Willingness to accept feelings, beliefs different from your own); Traditionalism (Adherence to tradition especially in cultural or religious practice, resistance to change); Tranquility (State of being calm, peaceful, serene); Trustworthiness (Deserving of trust or confidence, honest, reliable or dependable); Uniqueness (Being the only one of its kind); Unity (State of being in full agreement); Vision (The aspirational description of what one would like to achieve or accomplish); Vitality (Physical or mental vigor, energy); Being Well-Groomed (Clean, tidy and well-dressed);

the system is embodied in software stored or installed in an electronic device (including digital memory disk, chip, card or drive, or computer), wherein the value chips are embodied as moveable icons, and the values board is embodied as a display matrix for the selected icons, wherein examples include PCs and personal electronics like smartphone and tablet apps; and/or the system is embodied in boxed kit, wherein the value chips are embodied as tangible disks and the values board is embodied as a display matrix for physically affixing the selected disks; for example, the chips may be paper or plastic disks, and/or the selected disks adhere to the visual value board by glue, hook-and-loop fastener, or magnet.

The invention also provides methods of using the subject systems. In one aspect, the method comprises: (a) selecting chips of the library according to the value and purpose prompts of the organization cards; and (b) displaying and mapping the selected chips on the visual values board; in another, the method comprises: (a) selecting chips of the library according to the value and purpose prompts of the worksheet and chip organizers; and (b) displaying and mapping the selected chips on the visual values board, wherein the selecting step may further comprise choosing between chips selected using a values bracketing template.

In another aspect, the invention provides a method of mapping human values and purpose comprising: (a) providing user-specific value and purpose input according and in response to predetermined value and purpose prompts of worksheet and organization wells/trays; (b) selecting chips of a library of value chips according to the user-specific value and purpose input; and (c) displaying and mapping the selected chips on a visual values board.

In embodiments, the method comprises addressing a subsequent life event of the user by referencing the visual values board, and determining the user's response to the life event according to and consistent with the selected chips on the visual values board.

The invention specifically provides all combinations of the recited embodiments, as if each had been laboriously individually set forth.

DETAILED DESCRIPTION OF PARTICULAR EMBODIMENTS AND EXAMPLE THEREOF

In a particular embodiment Coretography includes:

200 disks that each contain a potential value and definition;

20 peel and stick magnet backs; Four wells/trays with prompts to help you organize your thoughts and prioritize what you actually value;

Values Bracketing Template to help you choose between competing values;

Magnetized display board at the bottom of your box (Visual Values Board) to provide a forever visual reference of who you are and what you value;

A Coretography Worksheet and instructions

CORETOGRAPHY: CONNECTING THE DOTS BETWEEN WHO YOU CURRENTLY ARE AND WHO YOU ARE MEANT TO BE . . .

WORKSHEET

SECTION 1: VALUES PROMPT

WHAT MOTIVATES YOU?

WHAT DID YOU LOVE TO DO AS A CHILD?

I BELIEVE . . .

What do you believe in? Write from your stream of consciousness. Go!

WHO ARE YOUR PEEPS?

What qualities do you admire in other people? If you could have more of anyone in your world, you would choose people who . . .

HOW DO YOU WANT TO FEEL?

HOW WOULD THE PEOPLE WHO LOVE AND KNOW YOU DESCRIBE YOUR PERSONALITY?

WHAT VALUES HAVE YOU ADOPTED FROM OTHERS? (e.g. family, teachers, media, community)

Are these values really YOUR values?

WHOM DO YOU ADMIRE? WHY?

SECTION 2: WHO AM I, REALLY?

LIST YOUR VALUES HERE:

THESE ARE YOUR CORE VALUES 1.
2.
3.
. . .
15.

If You're Trying to Make a Tough Decision (ask yourself these questions)

What values does this opportunity support?

Does this opportunity excite me and make me happy?

Does this opportunity step on any of my values?

If the opportunity doesn't feel right, it's likely not a match with your values.

If You're Questioning Your Compatibility With Another Person

Look at your values list. How many values do you share with that person. The more values you have in common the greater the compatibility. Just for fun, think of a person that you just love being around. How many values do you share? Then think of someone who you've never liked nor been able to get along with no matter how hard you've tried and you don't know why. Chances are they share very few if any of your values.

Top 10 Decisions You'll Make In Life

1. Should I end ANYTHING
2. Who I will marry
3. Who I will go on a date with
4. Will I have kids
5. Where will I live
6. Will I buy a house
7. Will I change careers/jobs
8. Will I go back to school/grad school
9. What will I choose as my college major?
10. Who will I choose as my friends?

Knowing what you value makes it easier to make decisions and builds the foundation for a happy life!

SECTION 3: WHY AM I HERE?
WHAT ARE YOUR PASSIONS?
(What makes you come alive?)
WHAT ARE YOUR TALENTS?
(What exceptional qualities were you born with?)
LIST YOUR SKILLS/EXPERTISE
(What skills have you mastered or are you capable and willing to master?)
WHAT IS YOUR SUPER POWER?
What have you always been better at than everyone else?
Your purpose sits at the intersection of your Passions, Talents, Skills and Core Values
KNOW YOUR VALUES.
FIND YOUR PURPOSE.
MAP YOUR HAPPY!
CELEBRITY CRUSH
Is there a public personality who has "the" dream job, a job that you would love to do and that you suspect you might be even better at than they are?
Who is it?
What is it that they do that you would love to do?
TOP 5 CORE VALUES (YOU SHOULD BE PROUD AND COMFORTABLE SHARING THESE WITH OTHERS)
Connect each opportunity with as many values as apply. You're looking for the opportunity that best suits your core values.
OPPORTUNITIES
What am I meant to do with my life? What are my opportunities or how will I fulfill my purpose?
PURPOSE PROMPTS
1. Think about the times you've experienced absolute joy. What were you doing?
2. What gives you energy?
3. What problems are you equipped to solve and care deeply about?
4. If you had to work 100 hours a week for the next year what would you choose to do that would feel the least like work to you?
5. What do you love to do so much that you lose track of time?
PROUD, HAPPY and FULFILLED
Think of 3 times in your life where you felt the most proud, happy and fulfilled.
List them below along with the reasons why you felt this way.
INSTANCE #1
INSTANCE #2
INSTANCE #3
II. INSTRUCTIONS: FOR AN AFTERNOON OF CLARITY:
1. REVIEW SECTION 1: Value Prompts on the Afternoon of Clarity Worksheet. Take a day or so to think about the questions before you answer them; this way you're working with thoughts beyond those first instincts (AKA allowing yourself to get to the good stuff). Once you've completed Section 1 you're ready to sit down to Coretograph.
2. Set out the box tray with individual wells labeled (or organize your header cards at the top of a large table, left to right in the following order):
ALWAYS VALUED
OFTEN VALUED
SOMETIMES VALUED
NEVER VALUED
3. Next, go through the value disks and quickly (follow your gut!) group them into the appropriate tray well (or header card) based on how YOU feel about the value (not how you think you should feel or how your mom or Oprah or your neighbor feels). When you go through this process you'll likely discover that at first there are way too many values that you want to prioritize. It helps to move your thought process away from What Do I Want? and more towards How Do I Want to Feel? For example, people will often throw "success" in their ALWAYS VALUE pile but they'll soon discover that "success" is actually just a means to an end because what they really want is to feel secure, loved and connected and they see "success" as a way to feel that way when in reality "success" may mean long hours away from family and worry and fear about keeping up so honoring "success" may actually make them feel exactly the opposite of secure, loved and connected. You'll end up having to narrow your choices down to 15 core values so make sure they are the ones that really make you who you are; that resonate to your core.
4. Once you've grouped all value disks into the appropriate tray well (or header card), put the value disks you classified as SOMETIMES VALUED and NEVER VALUED back into the box. Then put aside the value disks you classified as OFTEN VALUED.
5. Next take your ALWAYS VALUED group and whittle it down to your top 15 values, ranked in order of importance to you. If you have less than 15 value disks in your ALWAYS VALUED group, go back through your OFTEN VALUED disks again and rank them in order of importance. Choose your highest ranking value disks from the OFTEN VALUED group until you have 15 value disks in total that comprise your top 15 ALWAYS VALUED values.
6. If you have trouble choosing between several competing values, use the Values Bracket Template to make clearer and cleaner decisions about what values are good, better and best for you. You may use the Values Bracket Template to decide between two competing values or as many as eight by matching up two values at a time on the template and deciding which one is preferable.
7. Affix magnet backs to your top 15 values.
8. Then take your top 5 value disks and display them in order of importance at the top of your VISUAL VALUES BOARD in the Core Values circles (they may also be displayed on your refrigerator, mirror or any other magnetized surface). How do they differ from your remaining 10 values? Well, they are deeper—much deeper.
9. The next 10 values should be ordered by importance on the remaining values circles on your VISUAL VALUES BOARD. Think about the values that you've chosen. Are you proud of them? Do they reflect who you are? Would you want to shout them from the rooftop? If so, move on to the next step. If you're not 100% sure, you may want to give yourself some additional time to think about what you truly value. It may be helpful to place your VISUAL VALUES BOARD in a spot where you can refer to it several times a day. Don't force it. If this is the first time that you've ever thought about what you value you may need additional time to reflect on who you truly are and what is really important to you. When your VISUAL VALUES BOARD accurately depicts exactly who you are, you will know it and love it.
10. Once you're confident with your 15 values, fill out SECTION 2 on the Afternoon of Clarity Worksheet (entitled, "Who Am I, REALLY?").
11. Now make sure to place your values in a very visible place. When you're able to reflect on them on a daily basis, you'll be able to rely and refer to them when making difficult life decisions. They'll stand as little guideposts to the core of who you are and the kind of life you want to create. These are not values handed down by your family or values you think you should have or you wish you had. These are YOUR values; what YOU stand for. They are your own personal code and you should be very proud of them.

12. When faced with a tough decision, refer to your VISUAL VALUES BOARD and ask yourself these questions:

Which of my values does this opportunity support?

Does this opportunity make me happy? Am I excited about this opportunity? Trust your gut! If it doesn't feel right, it's likely not a match with your values.

13. If the opportunity (like a new job) supports values that seem to conflict with other values (for example financial success which requires working nights and weekends would conflict with spending quality time with family) you'll likely have to choose the higher ranked value to be happy. Repeat as necessary—lives change and certain values change; when you're young your definition of success may mean something completely different than it does when you're older and have children. It is recommended to Coretograph once a year.

SECTION 3: The Purpose Piece

Why we're on this earth and what we're meant to do during our time here are questions that man has been contemplating since the beginning of civilization. A lucky few have known their purpose since grade school, but for most of us it takes a lot of hard work, reflection and thought. (Discovering your values can feel like a walk in the park compared to finding your purpose. But the work is worth it for sure.) Remember, when doing this step, that we're looking for YOUR purpose, not what your parents, friends and significant others think your purpose should be. In fact, let's banish the word "should" from our vocabulary, shall we? No one can tell you what your purpose is but YOU . . . with the help of Coretography of course.

1. Review the questions posed in Section 3: The Purpose Piece. Answer them as directed. (Psst: don't get ahead of yourself and fill out the Purpose Circle or the What Am I Meant to Do With My Life section.)

A quick glossary of terms to help with this section:

Your Passions are those things that you just plain 'ol LOVE. Passions don't have to be things that you do, they can simply be a set of ideas that you strongly believe in such as gender equality or religion. Think of it as an interest or enthusiasm that you feel for something that gives you the motivation to make a fool of yourself just to learn more about it or be a part of it. No one can give you passion—it emanates from within.

Talents, on the other hand, are what you're born with. They're your natural ability to do something better than most anyone else—like perfect pitch in a vocalist, an exceptional artistic or athletic ability, or a photographic memory. In basketball a talent can be standing 6'10".

Skills take time, energy, work and practice to master. According to Malcolm Gladwell, it takes 10,000 hours of practice to become an expert at any important skill. You cannot develop a skill without working at it (no matter how much you wish and pray and bargain).

Clearly you can have passion for golf but have no talent in it or talent in golf but have no passion for it. Conversely, you can have both passion and talent for golf but if you don't put in your 10,000 hours it's unlikely that you'll have the skills required to play on the LPGA.

Your best chance for success is to find a Purpose that not only honors your core values but that you also have passion, natural talent and the skills for. When your purpose sits at the intersection of your Passions, Talents, Skills and Core Values you'll find yourself at your happiest and most fulfilled. You'll be completely absorbed, energized and focused in what you're doing and time will fall away. This is called flow. And it's incredible.

2. Review your entire Coretography worksheet and circle any words, themes or ideas that consistently come up. Sit back and review these highlights. What are the recurring themes? Does your Worksheet give you any insight into why you're here and what your Purpose might be?

Consider the following:

You may have more than one Purpose. Choose the Purpose that you care the most about. It should give your life meaning, direction and happiness.

Don't make finding your Purpose a bigger deal than it has to be. Your Purpose does not have to be one that involves curing cancer or eradicating poverty. You do not need to save the entire world. Your unique gifts only need to make a difference to your little piece of the world.

If you have a lot of passion but are lacking in a bit of talent or skills, your passion can often compensate for what is lacking by encouraging even more hard work. You'll be surprised at how much your passion and skills can grow when you just start doing what you truly love.

Remember, everyone is projecting their model of the world and what they want for you on you. This needs to be your Purpose not what others think your Purpose should be (even if they have lovely and well-meaning intentions).

Your purpose—like your values—may change as you get older.

If your Purpose is clear, write it in the Purpose Circle and continue on. If not, don't force it. Leave your worksheet and your Visual Values Board out where you can see them. Take some more time to think about the questions posed. Talk to your friends and family. Ask them what they believe you're passionate about and see as your gifts. Ask them what you love talking about—but remember (have we said this enough?), you're looking for YOUR purpose, not theirs.

If all else fails, spend an hour or two of quiet, uninterrupted time with a notebook. Write down everything that comes to your mind that could be your Purpose. When you feel any emotion this means that you're getting close. Just keep writing. When you've found your purpose you'll know it. It will hit you in your gut and be accompanied by a strong rush of emotion. Now look at the Purpose you've written down and compare it to the circled portions of your Afternoon of Clarity Worksheet. Your Purpose should be reflected in your values and honor and support the portions of your Coretography Worksheet that you circled. Record your Purpose in the Purpose Circle on your worksheet.

3. The second step of The Purpose Piece is to discover how you'll fulfill your Purpose. It will answer the question, "What Am I Meant To Do With My Life?" Sometimes your Purpose (Why Am I Here?) mirrors your Opportunities (What Am I Meant To Do With My Life?) and your Values (Who Am I?) perfectly. For example one of your Core Values might be To Teach, your Purpose might be To Teach Children And Demonstrate What is Possible and your best Opportunities might involve a job teaching at the local high school or a teaching job in another country. If your most important Core Value is Family then your best Opportunity is likely the teaching job at the local high school. Other times your Purpose can be much broader, for example To Help Others Live More Fulfilling Lives which can encompass all kinds of opportunities. Here you could fulfill your purpose by work as a physical therapist, a life coach, or a parent. The goal is to choose the opportunity or opportunities that best suits your Core Values.

Think of all of the Opportunities—both personally and professionally—that you currently have or that you could create in your life that are consistent with the highlighted words on your Worksheet and your Purpose. List them in the What Are Your Opportunities section of the worksheet. Is there one opportunity of the many opportunities that you've recorded that best suits your core values? Is that your best Opportunity? If your answer is yes, then congratulations, that is what you're meant to do with your life right now. If you're still unsure, again, just give it time. You know how the minute you start looking at buying a certain model of car you start seeing it everywhere? This frequency illusion or Baader-Meinhof phenomenon will kick in with your Purpose as well. Now that you've created this foundation of values and your goal is to find your Purpose and what you're meant to do with your life, you'll unconsciously look for opportunities everywhere that will mesh with your Values and Purpose. You already have the answer inside of yourself!

Well this is the end of the road, for now. You've made it through an Afternoon of Clarity and you should be very proud of yourself. We're pretty certain that the discoveries you've made today with Coretography will continue to be transformative for your life and that this truly is just the beginning. Remember: you can't force your values or your purpose so keep your Visual Values Board and worksheet somewhere where you can refer to them daily and reflect and process what you've learned about yourself. Over time, you may discover more clarity around your Values and/or Purpose—perhaps you'll find that your values need a bit of reordering or that your Purpose can be further refined. Consider Coretography the gift that keeps on giving because over time you'll gain new and deeper insights.

The invention encompasses all combinations of recited particular and preferred embodiments. It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein, including citations therein, are hereby incorporated by reference in their entirety for all purposes.

What is claimed is:

1. A personal coaching system for mapping human values and purpose of a user comprising:
   a coretography worksheet and instructions;
   wherein the coretography worksheet includes the following sections to be answered by the user; (1) Who am I? (What do I value?), (2) Why am I here? (What is my purpose?); and (3) What am I meant to do with my life? (How do I live my purpose?);
   the personal coaching system further includes:
   (a) a library of 200 value chips, each chip displaying a different human value, wherein each chip further comprises an annotation, example or definition of the corresponding value;
   (b) one or more chip organizers comprising value prompts and input sections for selecting user-relevant chips from the library, wherein the chip organizers are embodied wells or trays;
   (c) a values bracket template comprising value chip locators in a pair-wise tournament bracketing format, configured to assist the user in choosing between competing values; and
   (d) wherein the library of value chips includes a plurality of visual values consisting of: Acceptance; Accomplishment; Accuracy; Achievement; Adaptability; Affluence; Altruism; Ambition; Appreciation; Articulacy; Assertiveness; Authenticity; Balance; Being the Best; Beauty; Being Cool; Belonging; Boldness; Brilliance; Calmness; Camaraderie; Challenging the status quo; Charity; Charm; Chastity; Cheerfulness; Clarity; Cleanliness; Cleverness; Comfort; Commitment; Community; Compassion; Competitiveness; Composure; Confidence; Conformity; Cooperation; Connection; Contribution; Conviction; Courage; Craftiness; Creativity; Curiosity; Decorum; Dependability; Depth; Determination; Dignity; Diligence; Discipline; Diversity; Drive; Dominance; Education; Efficiency; Elegance; Entertainment; Enthusiasm; Entrepreneurism; Environmentalism; Equality; Excellence; Excitement; Exclusivity; Experience; Expertise; Exploration; Extravagance; Fairness; Faith; Fame; Family; Fashion; Fidelity; Fitness; Flexibility; Freedom; Friendship; Frugality; Fun; Gratitude; Happiness; Hard Work; Harmony; Health; Heart; Helpfulness; Hospitality; Humility; Humor; Imagination; Imperfection; Inclusivity; Independence; Ingenuity; Innovation; Inquisitiveness; Integrity; Intelligence; Intimacy; Intuition; Inventiveness; Investing; Joy; Justice; Leadership; Learning; Legacy; Living To Your Full Potential; Logic; Loyalty; Love; Maintaining the Status Quo; Making a Difference; Marriage; Mastery; Mindfulness; Moderation; Modesty; Motivating Others; Music; Mysteriousness; Nature; Open-mindedness; Optimism; Order; Organization; Originality; Passion; Patriotism; Peace; Perfection; Persistence; Personal Growth; Persuasiveness; Philanthropy; Piety; Playfulness; Pleasure; Privacy; Poise; Popularity; Power; Practicality; Presence; Precision; Problem Solving; Punctuality; Purity; Realism; Recognition; Recreation; Relationships; Relaxation; Resourcefulness; Respect; Security; Self-reliance; Sensuality; Serenity; Sexuality; Significance; Simplicity; Sincerity; Solitude; Sophistication; Speed; Spirituality; Spontaneity; Stability; Strength; Structure; Success; Teaching; Teamwork; Tidiness; Thoughtfulness; Traditionalism; Tranquility; Trustworthiness; Uniqueness; Unity; Vision; Vitality; and Being Well-Groomed;
   (e) a visual values board comprising 15 value chip locators and configured to display and map the selected user-relevant chips, wherein the value chips are selected from said library of value chips;
   (f) a set of 20 peel and stick magnet backs;
   (g) a magnetized display board located at the bottom of the visual values board for providing a visual reference;
   applying the personal coaching system using the following steps:
   selecting a plurality of value chips of the library according to the value prompts of the chip organizers; and
   wherein the chip organizers organizes the value chips into ranked categories; wherein the steps for ranking includes:
      grouping all value chips into two categories using the wells or trays; wherein two categories include ALWAYS VALUED and OFTEN VALUED;
      ranking the number of value chips to create top 15 values from ALWAYS VALUED group;
      if the user has less than 15 value chips in ALWAYS VALUED group, then selects the value chips from OFTEN VALUED group by ranking them in order of importance to the user;

choose the highest ranking value chips from the OFTEN VALUED group until the user has 15 value chips in total:

applying the values bracket template to decide between two competing values to decide which one is preferable; wherein as many as eight competing values can be decided by matching up two values at a time using the value bracket template;

affixing magnet backs to the user's top 15 value chips;

placing the top 5 values chips in order of importance on a plurality of value locators at the top of the visual values board; and placing the next 10 values chips in order of importance on the remaining value locators on the visual values board.

* * * * *